April 21, 1925.
M. SMITH
TEAKETTLE
Filed Aug. 21, 1924
1,534,670
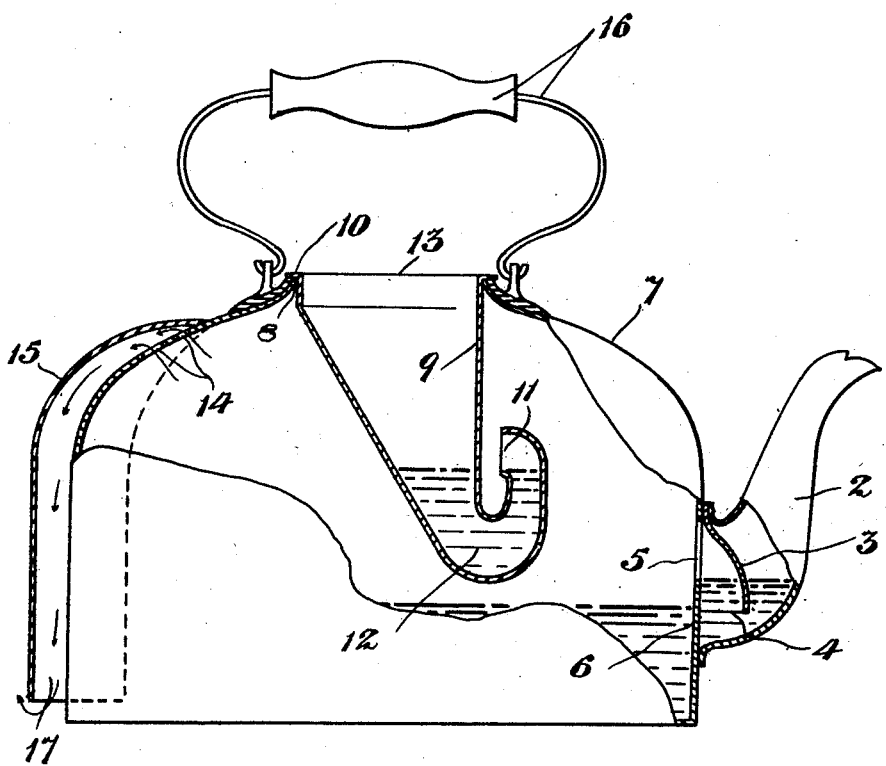
Inventor:
Malcolm Smith.

Patented Apr. 21, 1925.

1,534,670

UNITED STATES PATENT OFFICE.

MALCOLM SMITH, OF SEBA BEACH, ALBERTA, CANADA.

TEAKETTLE.

Application filed August 21, 1924. Serial No. 733,266.

*To all whom it may concern:*

Be it known that I, MALCOLM SMITH, a subject of the King of Great Britain, and residing in the village of Seba Beach, Province of Alberta, Canada, have invented a certain new and useful Improvement in Teakettles, of which the following is a specification.

My invention relates to improvements in tea kettles, or other vessels, in which liquids are boiled, and the object of the invention is to prevent a person being scalded by the steam issuing therefrom, and in the following specification and in the drawing forming part thereof, I shall describe and illustrate a disclosure within my invention, and what I claim as new will be set forth in the claims forming part of this specification.

The drawing represents a vertical central section through the major portion of a conventional form of tea kettle, showing a disclosure within my invention.

It is now well-known that in replenishing the ordinary tea kettle with water when the same is filled with steam, people frequently get burned through the steam escaping from the top of the kettle, that is, the aperture through which water is poured, and one of the objects of my invention is to prevent steam escaping through said aperture. Frequently a person's arm gets scalded or burned through steam issuing from the spout of the kettle, and it is another object of my invention to prevent steam escaping from said spout, and I shall now describe the preferred construction I utilize to carry out the said objects, and at the same time to permit a vessel or kettle constructed according to my invention, to function as readily as the ordinary type of kettle.

2 is the spout, and located at the lower end thereof is a suitable water trap, which obviously must contain sufficient water to permit this trap to function properly. This trap may be conveniently constructed as follows:

3 is a plate suitably supported at its upper end, and the lower edge 4 of this plate extends a suitable distance below the bottom of the port 5 formed in the front side 6 of the vessel or kettle 7. The plate 3 is so located in respect of the front side 6 and the lower portion of said spout 2 as to provide the necessary path for the liquid to pass through this trap and out of the spout. Sufficient has been stated to show that no matter how much boiling water may be in the kettle, while water may be freely poured therefrom through the spout 2, steam cannot independently escape through said spout.

Obviously sufficient water will always be held in the said trap.

Located within the body of said vessel or kettle is another trap, and this trap prevents the escape of steam through the filling aperture 8. This trap is conveniently formed of a vessel 9 having a flange 10 which rests upon the edge of the filling aperture 8. This vessel 9 is provided with an outlet 11, which outlet is located above the bottom 12 of said vessel 9. The water to replenish said vessel or kettle is poured into the vessel 9 and escapes through the outlet 11 thereof into the interior of said vessel or kettle 7. Obviously no matter at what level the water may be within the kettle, a water seal will be maintained intermediate the outlet 11 and the intake 13 of the vessel 9, and therefore steam will be prevented from escaping through the filling aperture 8.

Of course some vent must be provided for the steam, and this vent must be located at the upper portion of said vessel or kettle 7, and above the level of the water therein. Ports 14 are provided to carry away the steam, and these ports open into a conduit 15 which has a vent or outlet so located as to prevent steam from coming into contact with the hand manipulating the kettle or vessel 7 through the medium of the handle 16. 17 is a convenient outlet or vent for said conduit.

This conduit is shown as attached to the outside of the vessel or kettle 7 to house the ports 14, because this is the construction which can be employed to adapt existing kettles or vessels to this invention.

It will be observed that the lower end of the conduit 15, in the disclosure made, is above the bottom of the vessel or kettle 7, thereby permitting free escape of the steam.

The vessel 9 is readily removed for any desired purpose, and although I have not shown a lid or cover for said vessel this may be used if desired. Really no lid or cover is required.

While I have described what I consider to be the best embodiment within my invention, it must be understood that the principle thereof may be embodied in many different forms, and I desire not to be limited beyond the requirements of the prior art and the terms of my claims.

What I claim is:

1. In combination a vessel having a filling aperture and steam ports, and an outlet port; a spout associated with said outlet port; a water trap located in said spout and adapted to prevent the passage of steam through said spout; a water trap removably associated with the filling aperture of said vessel and adapted to permit water to pass therethrough into said vessel and to prevent the escape of steam through said filling aperture, and means to receive steam through said ports and adapted to discharge it.

2. In combination a vessel having a filling aperture and steam ports, and an outlet port; a spout attached to the side of said vessel over said outlet port and with its lower portion below the bottom of said port; a plate associated with said vessel and located within the bottom of said spout and with its lower edge below the bottom of said port, and adapted to permit the free flow of water through said spout and the formation of a water trap; a water-trap-provided vessel removably mounted within said first-mentioned vessel through the filling aperture thereof and adapted to permit of the replenishing of said first-mentioned vessel with liquid, and to prevent the escape of steam through said filling aperture, and a conduit associated with said first-mentioned vessel and adapted to receive the steam escaping through said steam ports.

MAC SMITH.